United States Patent [19]
Wong et al.

[11] Patent Number: 6,040,837
[45] Date of Patent: Mar. 21, 2000

[54] METHOD AND APPARATUS FOR SPACE VARIABLE TEXTURE FILTERING

[75] Inventors: Daniel Wong, North York; Milivoje Aleksic, Richmond Hill, both of Canada

[73] Assignee: ATI Technologies, Inc., Thornhill, Canada

[21] Appl. No.: 09/064,630

[22] Filed: Apr. 22, 1998

[51] Int. Cl.$^7$ .................................................. G06T 17/00
[52] U.S. Cl. .......................................................... 345/430
[58] Field of Search ................................. 345/418, 423, 345/424, 425, 428, 429, 430

[56] References Cited

U.S. PATENT DOCUMENTS

| | | | |
|---|---|---|---|
| 5,889,526 | 3/1999 | Hashimoto | 345/430 |
| 5,900,882 | 5/1999 | Jee | 345/430 |
| 5,903,270 | 5/1999 | Gentry et al. | 345/430 |
| 5,917,497 | 6/1999 | Saunders | 345/430 |
| 5,933,148 | 8/1999 | Oka et al. | 345/430 |

Primary Examiner—Phu K. Nguyen
Assistant Examiner—Cliff N. Vo
Attorney, Agent, or Firm—Markison & Reckamp, PC

[57] ABSTRACT

A method and apparatus for space variant texture filtering begins when texture coordinates for a given pixel of an object being rendered are received. From the texture coordinates, first and second axis derivatives are determined. When the first and second axis derivatives have differing degrees of magnitude, a determination is made as to whether the first access derivative or the second axis derivative corresponds to a major axis. Next, a number of samples along the major axis are determined based on a logarithmic function of a ratio between the first and second derivatives. Having obtained the number of samples, a separation between the samples is determined based on derivatives along the major axis. Having obtained the number of samples and separation, one of a plurality of related texture maps (e.g., MIP maps) is referenced based on the derivatives along a minor access to obtain the samples. Having obtained the samples, they are filtered based on the number of samples to obtain a filtered texel for the given pixel.

42 Claims, 4 Drawing Sheets

METHOD AND APPARATUS FOR SPACE VARIABLE TEXTURE FILTERING

TECHNICAL FIELD OF THE INVENTION

This invention relates generally to video graphics circuitry and more particularly to texture mapping.

BACKGROUND OF THE INVENTION

As is known, video graphics circuitry is used in computer systems. Such video graphic circuitry functions as a co-processor to the central processing unit of the computer wherein the video graphics circuitry processes graphical functions such as drawings, paintings, video games, etc., to produce data for display.

In a simple two-dimensional display, the video graphics circuitry received graphical data and commands from the central processing unit and executes the commands upon the graphics data to render the two-dimensional image. Such two-dimensional images may be generated while the central processing unit is performing two-dimensional applications, such as word processing, drawing packages, presentation applications, spreadsheet applications, etc.

Video graphic circuitry is also capable of rendering three-dimensional images. To render three-dimensional images, the central processing unit provides the video graphics circuitry with commands and graphics data. The commands indicate how the video graphic circuitry is to process the graphics data to render three-dimensional images on a display. The graphical data and/or commands may include color information, physical coordinates of object elements being rendered, texture coordinates of the object elements and/or alpha blending parameters. The texture coordinates are utilized to map a texture onto a particular object element as it is rendered in the physical space of the display.

When a three-dimensional image is being rendered as a perspective view, i.e., having a portion of the image appear closer and another portion of the image appear further away, MIP mapping is utilized. MIP mapping provides a plurality of texture maps wherein the first texture map is an uncompressed texture map. A second texture map of the plurality of texture maps is a four-to-one compressed texture map, where the length and width of the first texture map are each divided by two. The third texture map is a sixteen-to-one compressed texture map, where the length and width of the first texture map are each divided by four. The plurality of textures maps continue dividing the length and width of the first texture map by $2^N$ until the compressed texture map has been compressed to a single texel.

When rendering perspective objects, the rendering circuitry of the video graphics circuit accesses one of the plurality of MIP maps to retrieve the appropriate texel for the current pixel being rendered. As the closer portions of the perspective object are being rendered, the rendering circuitry accesses the less compressed MIP maps (e.g., the uncompressed texture map, the four-to-one texture map, the sixteen-to-one texture map). When the further away portions of the perspective object are being rendered, the rendering circuitry accesses more compressed MIP maps (e.g., sixteen-to-one texture map, thirty-two-to-one texture map, etc.). Rendering perspective objects using various MIP maps works well as long as the perspective scaling in the X and Y direction are equal.

If, however, the perspective compressed ratio is different in the X direction than in the Y direction, the MIP map technique produces less than ideal visual results. Anistropic filtering was developed to improve the MIP mapping technique when the X and Y compression ratios are different for perspective objects. When dealing with uneven compression ratios, the resulting footprint in the texture map for the pixel may be estimated by a parallelogram. The center of the parallelogram is the pixel center. A rectangle of the same area as the parallelogram may be approximated by using the parallelogram's area and height as the rectangle's dimensions. The rectangle is then filtered across to determine the pixel value. Therefore, the short side of the rectangle will be used to determine the MIP map to access, while the ratio between the long and short sides of the rectangle provides the number of samples to reconstruct.

To filter across the rectangle, however, is quite computationally intensive when using a Jacobian process. For example, the number of samples to reconstruct needs to be determined and the location of the samples within the rectangle. In addition, the samples may be prescribed different weighting factors, which need to be determined. Each of the processes is, in themselves, computationally intensive, but when combined, makes such a process cost prohibitive for commercial grade video graphics circuits.

Therefore, a need exists for a method and apparatus that more efficiently performs anistropic filtering.

DETAILED DESCRIPTION OF A PREFERRED EMBODIMENT

Generally, the present invention provides a method and apparatus for space variant texture filtering. The space variant texture filtering process begins when texture coordinates for a given pixel of an object being rendered are received. From the texture coordinates, first and second axis derivatives are determined. When the first and second axis derivatives have differing degrees of magnitude (e.g., have a ratio greater than 1.5 to 1), a determination is made as to whether the first access derivative or the second axis derivative corresponds to a major axis (i.e., the axis in which the rate of change is the greatest). Next, a number of samples along the major axis are determined based on a logarithmic function of a ratio between the first and second derivatives. Having obtained the number of samples, a separation between the samples is determined based on derivatives along the major axis. Having obtained the number of samples and separation, one of a plurality of related texture maps (e.g., MIP maps) is referenced based on the derivatives along a minor access to obtain the samples. Having obtained the samples, they are filtered based on the number of samples to obtain a filtered texel for the given pixel. With such a method and apparatus the mathematical computation of anistropic filtering can be simplified by limiting the number of samples based on a logarithmic function between the derivatives along the major axis and the derivatives along the minor axis and further limiting the number of samples to the power of two. By including such constraints, the computational complexity of anisotropic filtering is substantially reduced thus making it a viable feature for commercial grade video graphic circuits.

Figure 1:
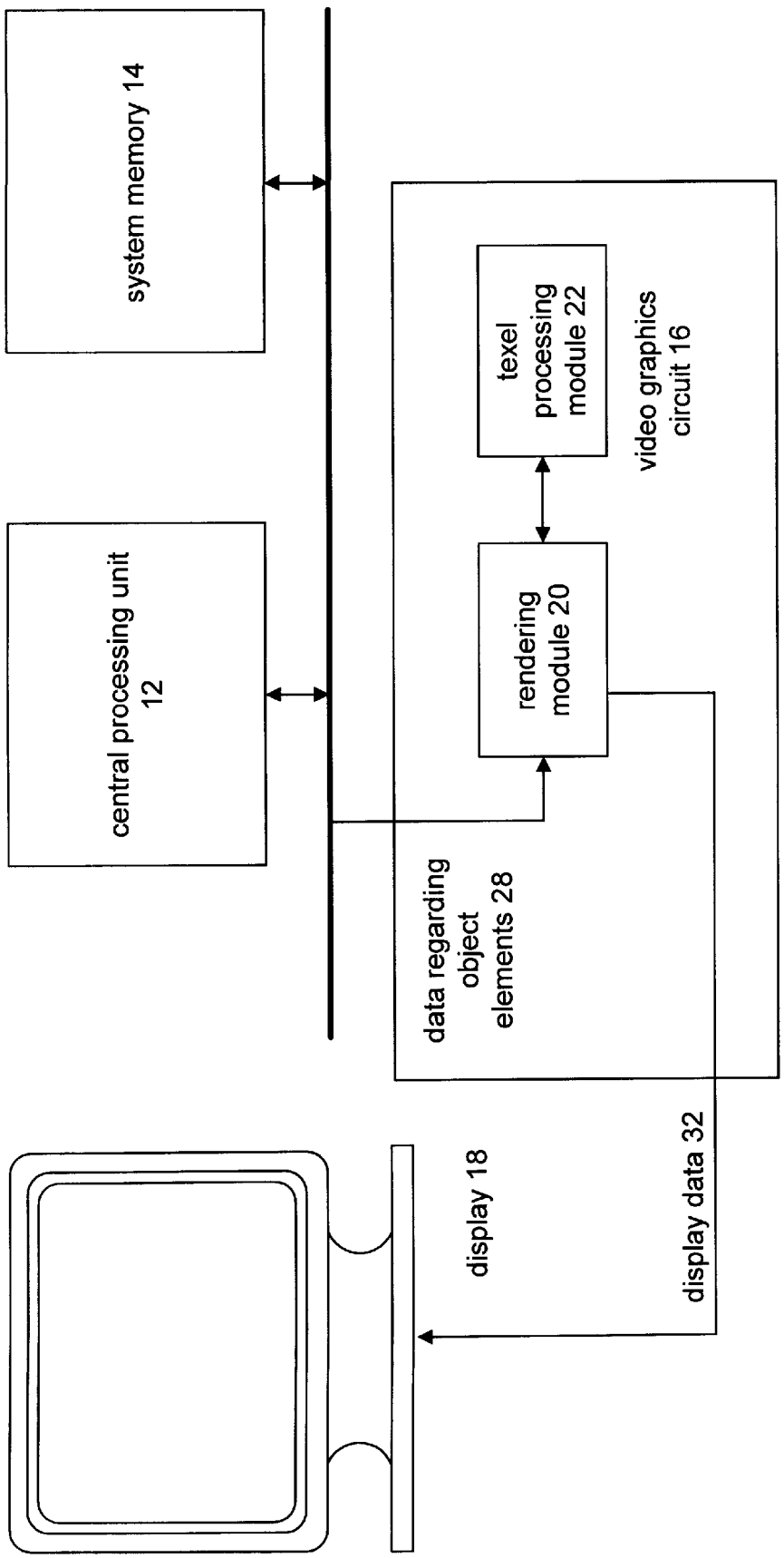
FIG. 1 illustrates a schematic block diagram of a computing system in accordance with the present invention.

The present invention can be more fully described with reference to FIGS. 1 through 4. FIG. 1 illustrates a schematic block diagram of a computing system 10 that includes a central processing unit 12, system memory 14, video graphics circuit 16 and a display 18. The central processing unit 12 may be a central processing unit as found in a personal computer, laptop computer, personal digital assistant (PDA), a hand-held personal computer, a work station, or an integrated circuit or a plurality of integrated circuits such as a microprocessor, microcomputer, digital signal processor, and/or any device that manipulates digital information based on programming instructions. The system memory 14 may be read-only memory, random access memory, floppy disk memory, hard disk memory, magnetic tape memory, CD ROM memory, DVD memory, and/or any other device that stores digital information.

The video graphics circuit 16 includes a rendering module 20 and a texel processing module 22. The rendering module 20 is operably coupled to receive data regarding object elements 28 from the central processing unit 12. The rendering module 20, which may include a setup engine, edgewalker circuit, and pixel processor, processes the data to render objects to produce display data 32. While rendering the objects, the rendering module 20 interfaces with the texel processing module 22 to retrieve texels regarding pixels that are currently being rendered. The texel processing module 22 will be discussed in greater detail with reference to FIGS. 2 through 4. Note that the texture processing module 22 may be a co-processor contained within the video graphics circuit, an individual co-processing device, such as a microprocessor, micro-controller, digital signal processor, etc. In addition, the texel processing module 22 may include memory for storing programming instructions that enable it to process texel information for the rendering module 20. The memory contained in the texel processing module may be equivalent to the types of memory available for the system memory 14.

Figure 2:
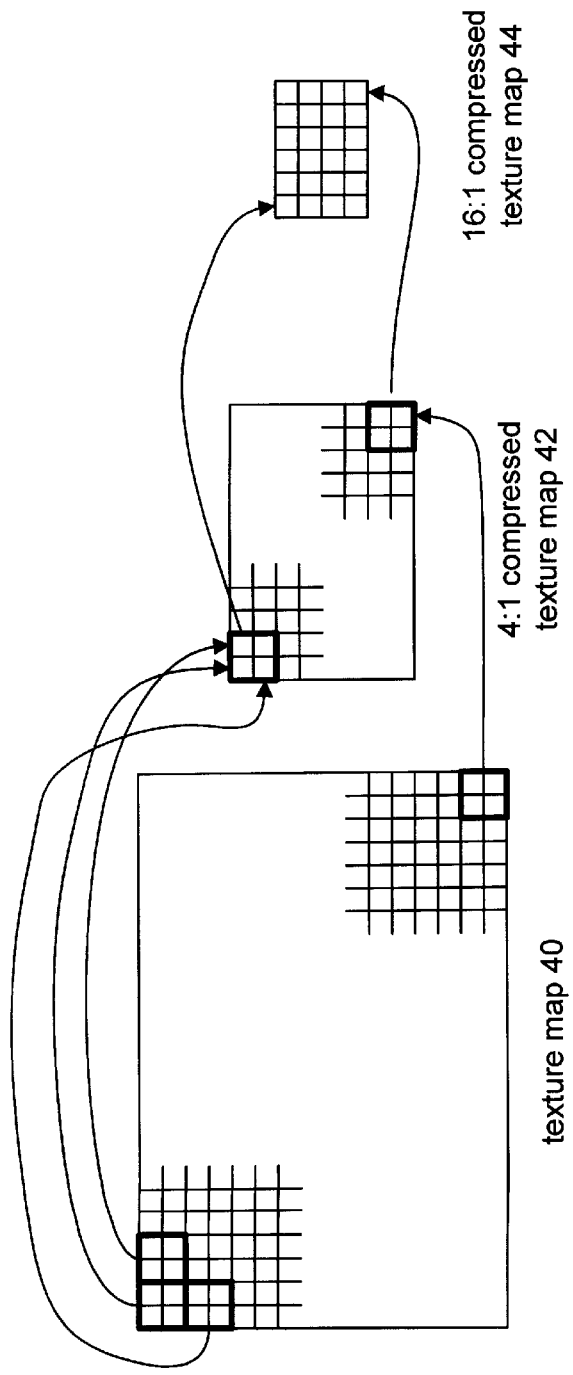
FIG. 2 illustrates a graphical representation of anistropic filtering in accordance with the present invention.
Figure 2:
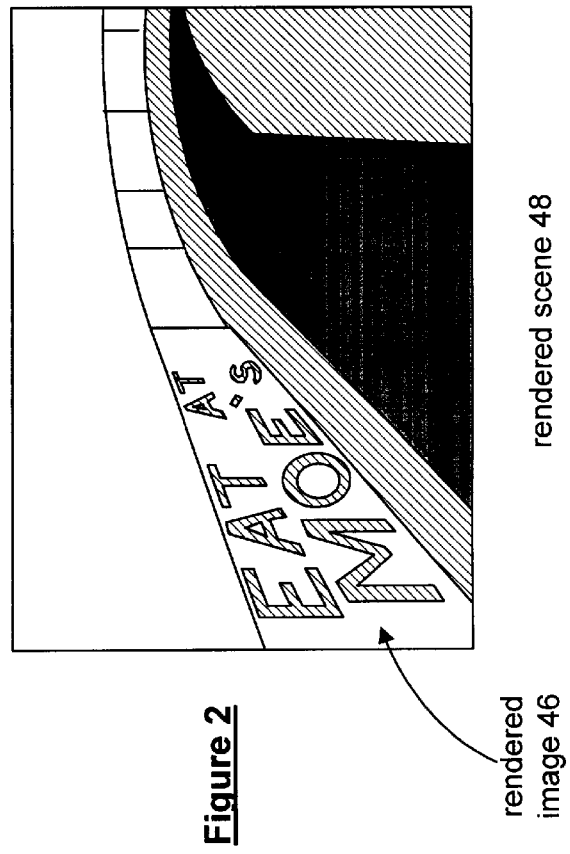
Figure 2:
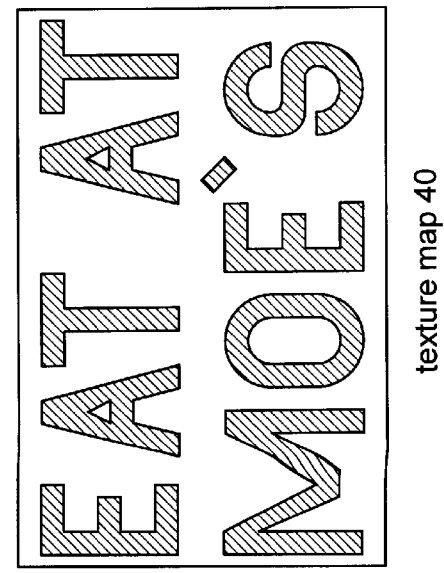

FIG. 2 illustrates a graphical representation of the function of the texel processing module 22. The texel processing module 22 utilizes a plurality of related texture maps to provide perspective texel information for a rendered image 46 that appears in a rendered scene 48. The rendered image 46 is a banner along a track that is perspectively fading into the distance. As such, the mapping of the texture map onto the rendered image has the texels at the left portion of the screen being larger than the texels at the right portion of the rendered image 46. As such, the compression ratio at the left end of the image is smaller than the compression ratio at the right end of the image. In addition, the compression ratio in the Y direction is different than in the X direction and the ratios may change from pixel to pixel. As shown, the compression ratio in the Y direction is greater than the compression ratio in the X direction. As such, the X axis corresponds to the minor axis while the Y axis corresponds to the major axis.

The texture map 40 is shown at full scale to include the texture of the phrase "eat at Moe's". The related texture maps include a full scale texture map 40, a four-to-one compression texture map 42, and a sixteen-to-one compression texture map 44. Note that these MIP maps, or related texture maps, may be continually compressed until one texel remains. As shown, four texels of the texture map 40 are compressed into a single texel of the four-to-one compressed texture map 42. Similarly, four texels of the four-to-one compression texture map 42 are compressed into a single texel of the sixteen-to-one compressed texture map.

Figure 3:
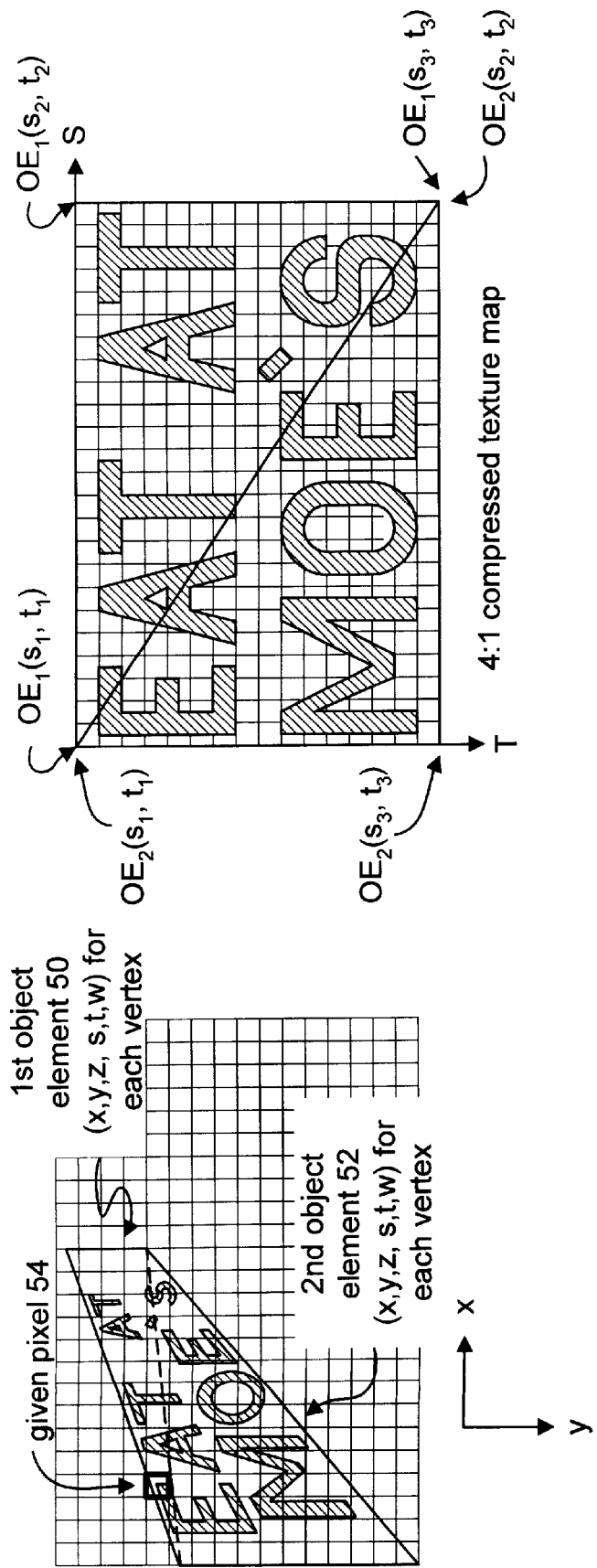
FIG. 3 illustrates another graphical representation of the anistropic filtering in accordance with the present invention.
Figure 3:
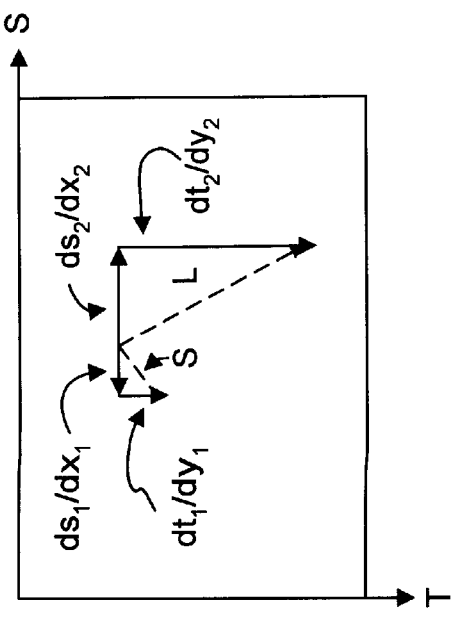

FIG. 3 illustrates a graphical representation of the function of the texel processing module 22 utilizing the plurality of texture maps to produce the rendered image 46 of FIG. 2. As shown in the upper-left portion of FIG. 3, a given pixel 54 is being rendered in the first object element 50. The image in the upper-left portion of FIG. 3 further includes a second object element 52 wherein each of the object elements 50 and 52 include physical coordinates X, Y, Z and texture coordinates S, T & W. Each of the coordinates corresponds to one of the vertices of the object elements (e.g., triangles) being rendered. As can be seen in the image in the upper-left portion, the compression ratio in the Y direction is approximately four, while in the X direction is approximately two, thus the X direction corresponds to the minor axis and is used to select the texture map for the given pixel. Since the compression ratio in the X direction is approximately two, the four-to-one compressed texture map 42 would be utilized to render the given pixel 54.

Based on these values, a first axis derivative ($\delta s/\delta x$ and $\delta t/\delta x$) and second axis derivatives ($\delta s/\delta y$ and $\delta t/\delta y$) are derived. As can be seen in FIG. 3, the derivatives associated with the Y direction correspond to the major axis, where L represents the major axis and S represents the minor axis. By defining $2^N = L/S$, the number of samples can be derived based on the function of:

$$N = \log_2(L) - \log_2(S).$$

For example, if N=2, four samples would be retrieved. The first sample would be obtained along the major axis at the coordinates $(s+\Delta s/2, t+\Delta t/2)$, where $\Delta s = \delta s/\delta j \div 2^N$ where $\delta j$ equals the Delta in the major direction and $\Delta t = \delta t/\delta y \div 2^N$. The second sample is obtained from the texel coordinates of $(s-\Delta s/2, t-\Delta t/2)$. The third sample is derived from $(s+\Delta s/2+\Delta s, t+\Delta t/2+\Delta t)$. The fourth sample point is derived from $(s-\Delta s/2-\Delta s, t-\Delta t/2-\Delta t)$. If N is greater than 2, then subsequent samples may be obtained by offsetting a previous sample by $(\Delta s, \Delta t)$.

Having obtained the four samples, they are added and then divided by four. Note that a division of 2 is equivalent to a shift right function while a division of four is equivalent to a double shift right function. As such, by utilizing the logarithmic functions and the requirements that the number of samples be based on the powers of 2, the mathematical computation complexity of anistropic filtering is substantially reduced to utilizing shift right functions instead of divisions.

Figure 4:
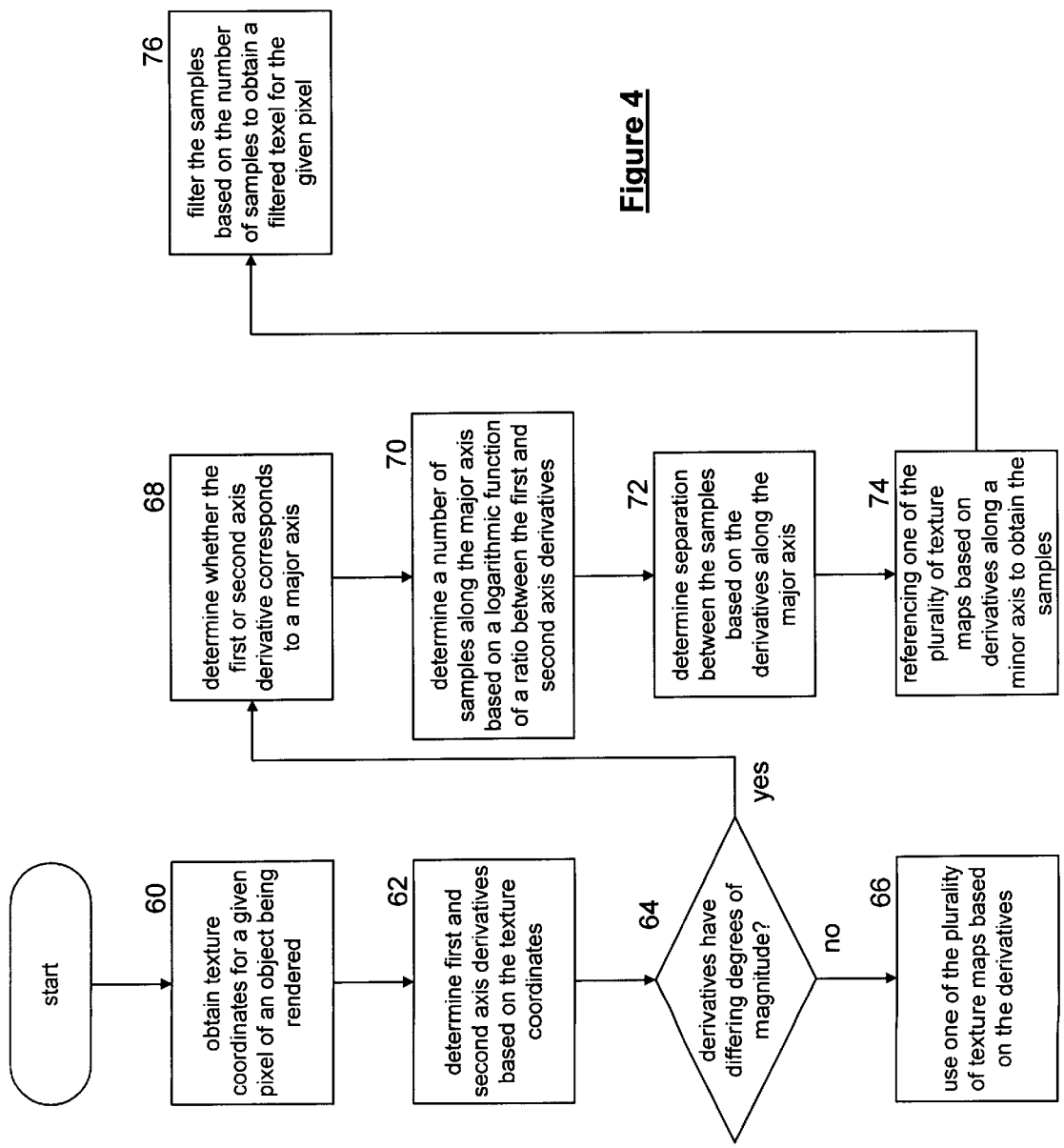
FIG. 4 illustrates a logic diagram of a method for space variant texture filtering in accordance with the present invention.

FIG. 4 illustrates a logic diagram of a method for space variant texture filtering. The process begins at step 60 where texture coordinates for a given pixel of an object being rendered are obtained. As previously mentioned, the texture coordinates provide information as to how a texture map, or portion thereof, is to be mapped onto an object. The process then proceeds to step 62 where first and second axis derivatives are determined based on the texture coordinates. Such a determination may be made by relating derivatives of an S-T plane of one of the plurality of texture maps to an X-Y plane of a display. Note that the texture coordinate lie within the S-T plane of the texture map.

The process then proceeds to step 64 where a determination is made as to whether the derivatives have different degrees of magnitude. Differing degrees of magnitude would indicate that the magnitude has a ratio greater than 1.5 to 1. If the magnitudes do not vary by such a degree, the process proceeds to step 66 where one of the plurality of texture maps is selected. The selection of the one of the plurality of texture maps is based on the derivatives along the minor axis or the major axis. (Note that it does not matter which axis is used since they are essentially the same.) As such, one of the MIP maps is used without anistropic filtering.

If, however, the derivatives have magnitudes that differ by a degree, the process proceeds to step 68. At step 68, a determination is made as to whether the first or second axis corresponds to the major axis. Note that the difference between the magnitudes of the derivatives may be determined by comparing the magnitude of the first derivative with the magnitude of the second derivative. When the magnitude of the first derivative is at least a degree larger than the magnitude of the second axis derivative, the first axis derivative corresponds to the major axis. Such a determination is based on the value of N.

The process then proceeds to step 70 where a number of samples along the major axis is determined based on the logarithmic function and a ratio between the first and second derivatives a number of samples along the major axis is determined based on a logarithmic function of a ratio between the first and second axis derivatives. Limiting the ratio between the magnitudes of the first and second derivatives to $2^N$ further enhances the determination at step 68. As such, the magnitude of the major axis equals $2^N$ times the magnitude of the minor axis where N equals the number of samples. The logarithmic function is: an integer of [$\log_2$(magnitude of the derivative along the major axis)–$\log_2$(magnitude of the derivative along the minor axis)].

The process then proceeds to step 72 where the separation between the samples is determined based on the derivatives along the major axis. Such a determination may be made by right shifting the derivatives along the major axis by the result of the logarithmic function (i.e., the number of samples).

The process then proceeds to step 74 where one of the plurality of related texture maps is referenced based on the derivatives along the minor axis to obtain the samples. The process then proceeds to step 76 where the samples are filtered based on the number of samples to obtain a filtered texel for the given pixel. Note that the filtering may be done by summing values of the samples to obtain a sample resultant and then shifting right the sample resultant by the result of the logarithmic function.

The preceding discussion has presented a method and apparatus for providing space variant texture filtering in a video graphics circuit. By limiting the number of samples to $2^N$ and utilizing a logarithmic function, the complex mathematics of anisotropic filtering is substantially reduced. As such, by reducing the computational intensity of anisotropic filtering, such filtering may be readily usable in commercial grade video graphic circuits.

What is claimed is:

1. A method for space variant texture filtering, the method comprises the steps of:
   a) obtaining texture coordinates for a given pixel of an object being rendered;
   b) determining a first axis derivative and a second axis derivative based on the texture coordinates;
   c) when the first and second axis derivatives have differing degrees of magnitude, determining whether the first axis derivative or the second axis derivative corresponds to a major axis;
   d) determining a number of samples along the major axis based on a logarithmic function of a ratio between the first and second axis derivatives;
   e) determining separation between the samples based on derivatives along the major axis;
   f) referencing one of a plurality of related texture maps based on derivatives along a minor axis to obtain the samples; and
   g) filtering the samples based on the number of samples to obtain a filtered texel for the given pixel.

2. The method of claim 1, wherein step (b) further comprises relating derivatives of an S-T plane of the one of the plurality of texture maps to an X-Y plane of a display to derive the first and second axis derivatives, wherein the texture coordinates lie within the S-T plane of the texture map.

3. The method of claim 2, wherein step (c) further comprises comparing a magnitude of the first axis derivative with a magnitude of the second axis derivative, wherein when the magnitude of the first axis derivative is at least a degree larger than the magnitude of the second axis derivative, the first axis derivative corresponds to the major axis, and wherein the magnitudes of the first and second axis are measured in the X-Y plane.

4. The method of claim 1, wherein the ratio between the first and second axis derivatives is limited to $2^n$=magnitude of the major axis to magnitude of minor axis, wherein n equals the number of samples.

5. The method of claim 1, wherein the logarithmic function comprises an integer of [$\log_2$(magnitude of the derivative along major axis)–$\log_2$(magnitude of the derivative along minor axis)].

6. The method of claim 5, wherein step (e) further comprises right shifting the derivatives along the major axis by a resultant of the logarithmic function.

7. The method of claim 5, wherein step (g) further comprises:
   summing values of the samples to obtain a sample resultant; and
   shifting right the sample resultant by a resultant of the logarithmic function.

8. A method for space variant texture filtering, the method comprises the step of:
   a) determining a major axis and a minor axis based on texture coordinates of a pixel of an object being rendered;
   b) determining a number of samples along the major axis based on a logarithmic function of a ratio between a variant along the major axis and a variant along the minor axis;
   c) referencing one of a plurality of related texture maps based on the derivatives along the minor axis to obtain the samples; and
   d) filtering the samples based on the number of samples to obtain a filtered texel for the pixel.

9. The method of claim 8, wherein step (a) further comprises relating derivatives of an S-T plane of the one of the plurality of texture maps to an X-Y plane of a display to determine the major and minor axis, wherein the texture coordinates lie within the S-T plane of the texture map.

10. The method of claim 8, wherein the ratio between the first and second axis derivatives is limited to $2^n$=magnitude of the major axis to magnitude of minor axis, wherein n equals the number of samples.

11. The method of claim 8, wherein the logarithmic function comprises an integer of [$\log_2$(the variant along major axis)–$\log_2$(the variant along minor axis)].

12. The method of claim 11, wherein step (c) further comprises determining separation between the samples based on derivatives along the minor axis.

13. The method of claim 12 further comprises right shifting the derivatives along the major axis by a resultant of the logarithmic function to determine the separation.

14. The method of claim 11, wherein step (d) further comprises:
   summing values of the samples to obtain a sample resultant; and
   shifting right the sample resultant by a resultant of the logarithmic function.

15. A video graphics processing circuit comprises:
   video graphics rendering module operably coupled to receive object element rendering data, wherein the object element rendering data at least includes texture map coordinates, and wherein the video graphics rendering module renders a pixel of an object element at least based on a filtered texel; and
   a texel processing module operably coupled to the video graphics rendering module, wherein the texel processing module stores and executes programming instructions, when the texel processing unit is executing the programming instructions, the texel processing unit functions to (a) obtain the texture coordinates for the pixel; (b) determine a first axis derivative and a second axis derivative based on the texture coordinates; (c) determine whether the first axis derivative or the second axis derivative corresponds to a major axis when the first and second axis derivatives have differing degrees of magnitude; (d) determine a number of samples along the major axis based on a logarithmic function of a ratio between the first and second axis derivatives; (e) determine separation between the samples based on derivatives along the major axis; (f) reference one of a plurality of related texture maps based on derivatives along a minor axis to obtain the samples; and (g) filter the samples based on the number of samples to obtain the filtered texel.

16. The video graphics circuit of claim 15, wherein the texel processing module further stores programming instructions that cause the texel processing module to relate derivatives of an S-T plane of the one of the plurality of texture maps to an X-Y plane of a display to derive the first and second axis derivatives, wherein the texture coordinates lie within the S-T plane of the texture map.

17. The video graphics circuit of claim 16, wherein the texel processing module further stores programming instructions that cause the texel processing module to compare a magnitude of the first axis derivative with a magnitude of the second axis derivative, wherein when the magnitude of the first axis derivative is at least a degree larger than the magnitude of the second axis derivative, the first axis derivative corresponds to the major axis, and wherein the magnitudes of the first and second axis are measured in the X-Y plane.

18. The video graphics circuit of claim 15, wherein the ratio between the first and second axis derivatives is limited to $2^n$=magnitude of the major axis to magnitude of minor axis, wherein n equals the number of samples.

19. The video graphics circuit of claim 15, wherein the logarithmic function comprises an integer of [$\log_2$(magnitude of the derivative along major axis)−$\log_2$(magnitude of the derivative along minor axis)].

20. The video graphics circuit of claim 19, wherein the texel processing module further stores programming instructions that cause the texel processing module to right shift the derivatives along the major axis by a resultant of the logarithmic function.

21. The video graphics circuit of claim 19, wherein the texel processing module further stores programming instructions that cause the texel processing module to:
   sum values of the samples to obtain a sample resultant; and
   shift right the sample resultant by a resultant of the logarithmic function.

22. A video graphics processing circuit comprises:
   video graphics rendering module operably coupled to receive object element rendering data, wherein the object element rendering data at least includes texture map coordinates, and wherein the video graphics rendering module renders a pixel of an object element at least based on a filtered texel;
   a texel processing module operably coupled to the video graphics rendering module, wherein the texel processing module stores and executes programming instructions, when the texel processing unit is executing the programming instructions, the texel processing unit functions to (a) determine a major axis and a minor axis based on the texture coordinates of the pixel; (b) determine a number of samples along the major axis based on a logarithmic function of a ratio between a variant along the major axis and a variant along the minor axis; (c) reference one of a plurality of related texture maps based on the derivatives along the minor axis to obtain the samples; and (d) filter the samples based on the number of samples to obtain the filtered texel.

23. The video graphics circuit of claim 22, wherein the texel processing module further stores programming instructions that cause the texel processing module to relate derivatives of an S-T plane of the one of the plurality of texture maps to an X-Y plane of a display to determine the major and minor axis, wherein the texture coordinates lie within the S-T plane of the texture map.

24. The video graphics circuit of claim 22, wherein the ratio between the first and second axis derivatives is limited to $2^n$=magnitude of the major axis to magnitude of minor axis, wherein n equals the number of samples.

25. The video graphics circuit of claim 22, wherein the logarithmic function comprises an integer of [$\log_2$(the variant along major axis)−$\log_2$(the variant along minor axis)].

26. The video graphics circuit of claim 25, wherein the texel processing module further stores programming instructions that cause the texel processing module to determine separation between the samples based on derivatives along the minor axis.

27. The video graphics circuit of claim 26, wherein the texel processing module further stores programming instructions that cause the texel processing module to right shift the derivatives along the major axis by a resultant of the logarithmic function to determine the separation.

28. The video graphics circuit of claim 26, wherein the texel processing module further stores programming instructions that cause the texel processing module to:
   sum values of the samples to obtain a sample resultant; and
   shift right the sample resultant by a resultant of the logarithmic function.

29. A digital storage medium for storing programming instructions that, when read by a processing unit, cause the processing unit to perform a space variant texture filtering function, the digital storage medium comprises:
   a first storage means for storing programming instructions that cause the processing unit to obtain texture coordinates for a given pixel of an object being rendered;
   a second storage means for storing programming instructions that cause the processing unit to determine a first axis derivative and a second axis derivative based on the texture coordinates;

a third storage means for storing programming instructions that cause the processing unit to determine whether the first axis derivative or the second axis derivative corresponds to a major axis when the first and second axis derivatives have differing degrees of magnitude;

a fourth storage means for storing programming instructions that cause the processing unit to determine a number of samples along the major axis based on a logarithmic function of a ratio between the first and second axis derivatives;

a fifth storage means for storing programming instructions that cause the processing unit to determine separation between the samples based on derivatives along the major axis;

a sixth storage means for storing programming instructions that cause the processing unit to reference one of a plurality of related texture maps based on derivatives along a minor axis to obtain the samples; and a seventh storage means for storing programming instructions that cause the processing unit to filter the samples based on the number of samples to obtain a filtered texel for the given pixel.

30. The digital storage medium of claim 29, wherein memory stores programming instructions that cause the processing unit to relate derivatives of an S-T plane of the one of the plurality of texture maps to an X-Y plane of a display to derive the first and second axis derivatives, wherein the texture coordinates lie within the S-T plane of the texture map.

31. The digital storage medium of claim 30, wherein memory stores programming instructions that cause the processing unit to compare a magnitude of the first axis derivative with a magnitude of the second axis derivative, wherein when the magnitude of the first axis derivative is at least a degree larger than the magnitude of the second axis derivative, the first axis derivative corresponds to the major axis, and wherein the magnitudes of the first and second axis are measured in the X-Y plane.

32. The digital storage medium of claim 29, wherein the ratio between the first and second axis derivatives is limited to $2^n$=magnitude of the major axis to magnitude of minor axis, wherein n equals the number of samples.

33. The digital storage medium of claim 29, wherein the logarithmic function comprises an integer of [$\log_2$(magnitude of the derivative along major axis)–$\log_2$(magnitude of the derivative along minor axis)].

34. The digital storage medium of claim 33, wherein memory stores programming instructions that cause the processing unit to right shift the derivatives along the major axis by a resultant of the logarithmic function.

35. The digital storage medium of claim 33, wherein memory stores programming instructions that cause the processing unit to:

sum values of the samples to obtain a sample resultant; and shift right the sample resultant by a resultant of the logarithmic function.

36. A digital storage medium for storing programming instructions that, when read by a processing unit, cause the processing unit to perform a space variant texture filtering function, the digital storage medium comprises:

a first storage means for storing programming instructions that cause the processing unit to determine a major axis and a minor axis based on texture coordinates of a pixel of an object being rendered;

a second storage means for storing programming instructions that cause the processing unit to determine a number of samples along the major axis based on a logarithmic function of a ratio between a variant along the major axis and a variant along the minor axis;

a third storage means for storing programming instructions that cause the processing unit to reference one of a plurality of related texture maps based on the derivatives along the minor axis to obtain the samples; and a fourth storage means for storing programming instructions that cause the processing unit to filter the samples based on the number of samples to obtain a filtered texel for the pixel.

37. The digital storage medium of claim 36 further stores programming instructions that cause the processing unit to relate derivatives of an S-T plane of the one of the plurality of texture maps to an X-Y plane of a display to determine the major and minor axis, wherein the texture coordinates lie within the S-T plane of the texture map.

38. The digital storage medium of claim 36, wherein the ratio between the first and second axis derivatives is limited to $2^n$=magnitude of the major axis to magnitude of minor axis, wherein n equals the number of samples.

39. The digital storage medium of claim 36, wherein the logarithmic function comprises an integer of [$\log_2$(the variant along major axis)–$\log_2$(the variant along minor axis)].

40. The digital storage medium of claim 39 further stores programming instructions that cause the processing unit to determine separation between the samples based on derivatives along the minor axis.

41. The digital storage medium of claim 40 further stores programming instructions that cause the processing unit to right shift the derivatives along the major axis by a resultant of the logarithmic function to determine the separation.

42. The digital storage medium of claim 40 further stores programming instructions that cause the processing unit to:

sum values of the samples to obtain a sample resultant; and shift right the sample resultant by a resultant of the logarithmic function.

* * * * *